United States Patent
Lin et al.

(10) Patent No.: US 11,164,351 B2
(45) Date of Patent: Nov. 2, 2021

(54) AUGMENTED REALITY FOR SENSOR APPLICATIONS

(71) Applicant: LP-RESEARCH INC., Tokyo (JP)

(72) Inventors: Zhuohua Lin, Tokyo (JP); Klaus Petersen, Tokyo (JP); Tobias Schlüter, Tokyo (JP); Huei Ee Yap, Tokyo (JP); Scean Monti Mitchell, Tokyo (JP)

(73) Assignee: LP-Research Inc., Tokyo (JP)

( * ) Notice: Subject to any disclaimer, the term of this patent is extended or adjusted under 35 U.S.C. 154(b) by 0 days.

(21) Appl. No.: 15/448,024

(22) Filed: Mar. 2, 2017

(65) Prior Publication Data

US 2018/0253876 A1 Sep. 6, 2018

(51) Int. Cl.
| | | |
|---|---|---|
| G06T 11/60 | (2006.01) |
| G06K 7/10 | (2006.01) |
| G06K 7/14 | (2006.01) |
| G05B 19/042 | (2006.01) |

(52) U.S. Cl.
CPC .......... *G06T 11/60* (2013.01); *G05B 19/0423* (2013.01); *G06K 7/10722* (2013.01); *G06K 7/1413* (2013.01); *G05B 2219/24215* (2013.01); *G05B 2219/32014* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,830,267 B2* | 9/2014 | Brackney | ............... | H05B 47/19 345/633 |
| 9,536,355 B1* | 1/2017 | Kumar | .................. | G06T 19/006 |
| 2006/0064716 A1* | 3/2006 | Sull | ..................... | G06F 16/7857 725/37 |
| 2010/0171705 A1* | 7/2010 | Lee | ........................ | G06F 1/1662 345/168 |
| 2011/0119609 A1* | 5/2011 | Bhatt | ..................... | G06F 3/0481 715/765 |
| 2012/0075343 A1* | 3/2012 | Chen | ...................... | G09G 5/397 345/633 |
| 2012/0283876 A1* | 11/2012 | Goldberg | ............... | A61B 34/30 700/264 |
| 2013/0120561 A1* | 5/2013 | Heintze | ................... | G01N 25/72 348/135 |
| 2013/0194627 A1* | 8/2013 | Nishiguchi | ........... | G06F 3/1293 358/1.15 |
| 2013/0201222 A1* | 8/2013 | Doyle | .................... | G16H 40/63 345/672 |
| 2013/0278635 A1* | 10/2013 | Maggiore | ............. | G06T 19/006 345/633 |

(Continued)

*Primary Examiner* — Andrew G Yang
(74) *Attorney, Agent, or Firm* — Erise IP, P.A.

(57) ABSTRACT

System, method, and media for an augmented reality interface for sensor applications. Machines making up a particular production or processing facility are instrumented with one or more sensors for monitoring their operation and status and labeled with machine-readable tags. When viewed by a technician through an augmented reality display, the machine-readable tags can be recognized using a computer-vision system and the associated machines can then be annotated with the relevant sensor and diagnostic data. The sensors may further form a mesh network in communication with a head-mounted display for an augmented reality system, eliminating the needs for centralized networking connections.

20 Claims, 4 Drawing Sheets

(56) References Cited

U.S. PATENT DOCUMENTS

| | | | |
|---|---|---|---|
| 2015/0062157 A1* | 3/2015 | Dragnea | G06T 19/006 345/633 |
| 2015/0160804 A1* | 6/2015 | Fujimoto | H04N 21/4316 715/811 |
| 2016/0098108 A1* | 4/2016 | Bliss | G06F 3/017 345/173 |
| 2016/0163112 A1* | 6/2016 | Mullins | H04L 67/12 345/633 |
| 2016/0277863 A1* | 9/2016 | Cahill | H04R 3/005 |
| 2017/0090196 A1* | 3/2017 | Hendron | G02B 27/0101 |
| 2017/0177939 A1* | 6/2017 | Beall | G06K 9/00671 |
| 2017/0249745 A1* | 8/2017 | Fiala | G06T 7/13 |
| 2017/0277559 A1* | 9/2017 | Mullins | G06F 3/011 |
| 2017/0294039 A1* | 10/2017 | Yajima | G02B 27/0172 |
| 2017/0344221 A1* | 11/2017 | Hokkanen | H04N 13/332 |
| 2018/0158245 A1* | 6/2018 | Govindan | G06F 3/04815 |
| 2018/0225616 A1* | 8/2018 | Jones | G06Q 10/04 |
| 2019/0351985 A1* | 11/2019 | Adamson | G06F 3/0346 |

\* cited by examiner

AUGMENTED REALITY FOR SENSOR APPLICATIONS

BACKGROUND

1. Field

Embodiments of the invention generally relate to augmented reality and, more particularly, to the use of machine-readable indicia in combination with sensors to present sensor data in an augmented reality display.

2. Related Art

Traditionally, processing plants and machinery are managed from a central control unit such as a SCADA supervisory control system. Such systems use a graphical user interface on the central controller to manage controller set point changes, field sensor data acquisition, and actuators. However, when a technician needs physical access to the machinery, they lose access to the dynamic display and management of data. Furthermore, the schematic display of data, while useful for high-level process control, can make it difficult to identify a particular physical machine in need of servicing. As such, there is a need for a display that can integrate sensor and diagnostic data for process machinery with real-world scene data of the machinery to allow a technician to quickly identify which piece of physical machinery is associated with an aberrant sensor reading.

SUMMARY

Embodiments of the invention address the above-described need by providing for an augmented reality interface for sensor applications. In particular, in a first embodiment, the invention includes a system for providing an augmented reality interface for sensor applications, comprising a plurality of sensors, wherein each sensor comprises a transducer and a communication interface, is configured to gather sensor data for a machine, and has an associated machine-readable indicium; a camera, configured to capture imagery of a scene including a machine-readable indicium associated with a sensor of the plurality of sensors, a processor, programmed to receive the camera imagery and recognize the machine-readable indicium, receive sensor data from the at least one sensor of the plurality of sensors, process the sensor data to generate a data visualization associated with the sensor of the plurality of sensors, generate an augmented display including the scene and the data visualization associated with the sensor of the plurality of sensors, and a portable display, configured to display the augmented scene in proximity to the scene.

In a second embodiment, the invention includes a method for generating an augmented reality display of a scene, comprising the steps of receiving, from a camera, imagery of a scene, wherein the imagery of the scene includes a machine with at least one machine-readable indicium associated with a sensor, processing the imagery of the scene to identify the machine-readable indicium, determining a sensor associated with the machine-readable indicium, retrieving, from the sensor, sensor data for the machine, generating a data visualization based on the sensor data for the machine, overlaying the data visualization on the imagery of the scene in proximity to the machine-readable indicium to form an augmented scene, and displaying the augmented scene on a display in proximity to the scene.

In a third embodiment, the invention includes one or more computer-storage media storing computer executable instructions that, when executed by a processor, perform a method of generating an augmented reality display of a scene, the method comprising the steps of receiving data from a plurality of sensors associated with a respective plurality of machines, wherein each sensor of the plurality of sensors is further associated with a respective machine-readable indicium, receiving imagery of a scene, wherein the imagery includes at least one visible machine-readable indicium, determining, based on the visible machine-readable indicium, a sensor of the plurality of sensors, generating a data visualization from the data received from the determined sensor, overlaying the data visualization on the imagery of the scene to form an augmented scene, and displaying the augmented scene on a display to the user.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide for an augmented reality interface for sensor applications. Machines making up a particular production or processing facility are instrumented with sensors for monitoring their operation and labeled with machine-readable tags. When viewed through an augmented reality display, the machine-readable tags can be recognized using a computer-vision system and the associated machines can then be annotated with the relevant sensor and diagnostic data.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Figure 1:
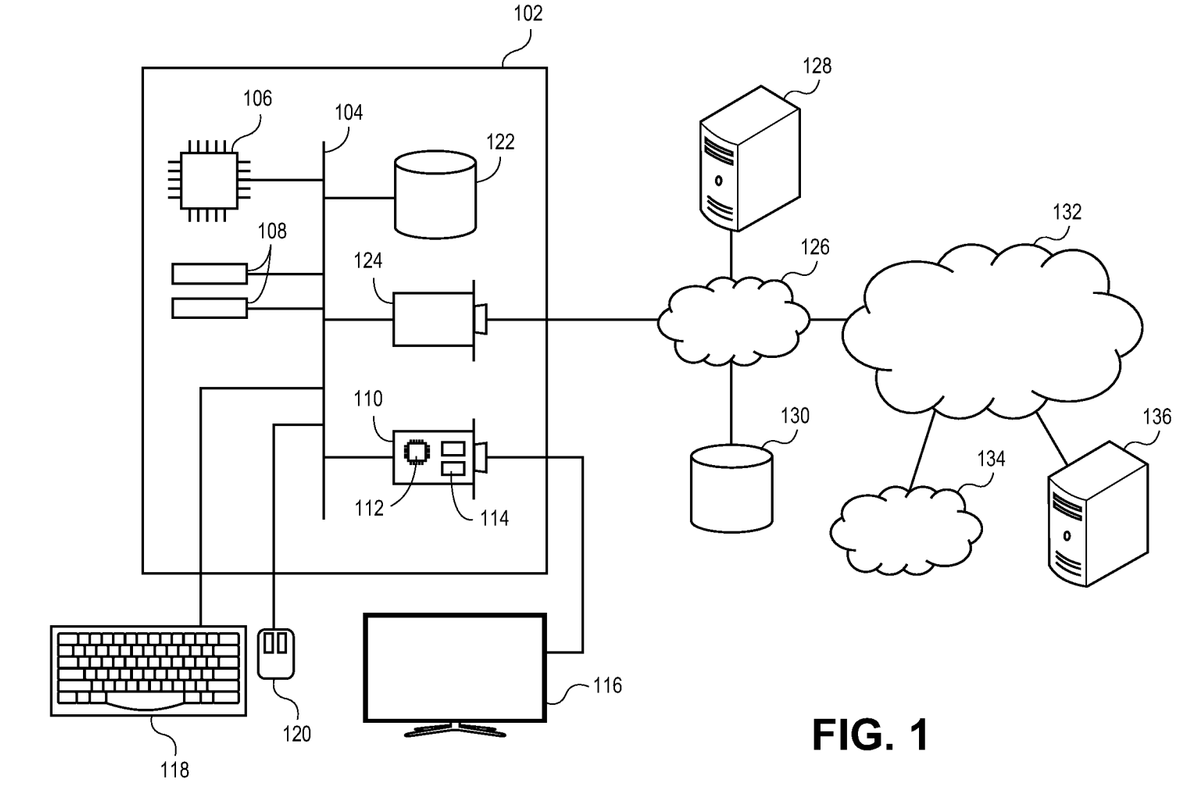
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or WiFi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
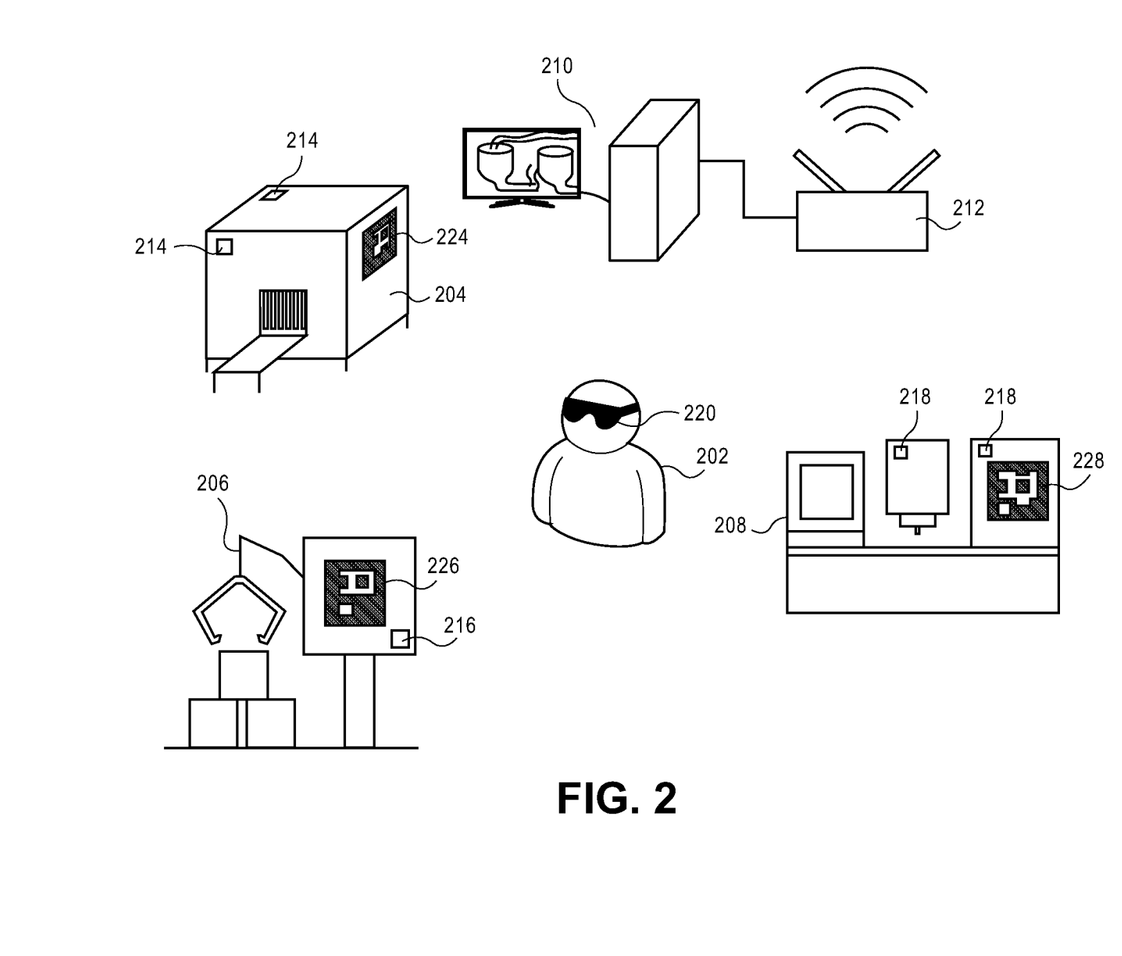
FIG. 2 depicts a diagram depicting an exemplary operational environment for embodiments of the invention.

Turning now to FIG. 2, a diagram depicting an exemplary operational environment for embodiments of the invention is depicted. In the depicted environment, user 202 is a technician supporting one or more items of machinery, including machine 204, machine 206, and machine 208. The term "machine" (as used in reference to machines such as machine 204, 206, or 208) should be construed broadly as any object that performs a task and may require maintenance or servicing. As depicted, machine 204 is a curing oven, machine 206 is a part picker, and machine 208 is a printer. However, a machine could be any other component of an assembly line, such as an individual machine tool, or a complete assembly line. Other machines are also contemplated. For example, a machine could be an individual server, storage rack, or networking element in a data center. Alternatively, a machine could be an automobile, or a particular component of an automobile. Machines 204, 206 and 208 could be identical (for example, a set of batch mixers), related (for example, part of the same production process), or completely unrelated.

In some embodiments, equipment including machines 204, 206 and 208 is controlled by a central controller 210 (for example, a SCADA system). In other embodiments, the various other components described herein communicate directly with each other in a peer-to-peer or mesh network fashion and do not require a central controller. Central controller 210 may monitor, control, track and/or log data from the equipment. For example, where the equipment makes up a production line, central controller 210 may guide partially competed product from machine 204 to machine 206 to machine 208. Central controller may also monitor the equipment for faults or other problems, as discussed in greater detail below. Central controller 210 may communicate with the controlled equipment via a wired network or wireless network including wireless access point 212, as described above with respect to FIG. 1. In particular, central controller may monitor the outputs of sensors 214 (corresponding to machine 204), sensors 216 (corresponding to machine 206) and sensors 218 (corresponding to machine 208).

Sensors such as sensors 214, 216, and 218 include some sort of transducer and a communication interface and may provide a variety of data regarding the operation of their respective machines. For example, a sensor may monitor the temperature of a particular production step, a vibrational mode of a machine, pressure in an enclosed vessel, rotation of a component (via an optical transducer or a Hall effect sensor), pH of a mixture, voltage or current across a particular electric or electronic component, imagery of a process or component in a visual, infrared or ultraviolet spectrum, or any other physical phenomena associated with the machine. As depicted with respect to machines 204 and 208, a single machine may have multiple associated sensors of the same type or disparate types. Sensors may be integrated into the equipment or retrofit.

In some embodiments, sensors 214, 216, and 218 communicate with central controller 210. Where the sensors are integrated into the associated machine, the sensors may communicate via the network interface of the machine. Alternatively, or where the sensors are retrofit on the machines, the sensors may communicate wirelessly with central controller 210, head-mounted display 220, respective machine-readable indicia 224, 226, and 228, and/or the other components of the system. Based on the data collected by the sensors, the system may determine that a machine is in an aberrant condition or otherwise experiencing a fault. For example, central controller 210 may process the data from sensors 218 to determine that a fault has occurred with machine 208, and that servicing is required. However, particularly where a large number of identical machines are present, it may be difficult for technician 202 to identify which machine needs servicing, and (if multiple machines need servicing) which fault is associated with which machine.

In some embodiments, data from sensors 214, 216, and 218 may be processed at central controller 210 using machine learning techniques to determine an operational state for the machine. For example, the system may process the sensor data during normal operation to learn the range of values from the sensors when the machine is operating correctly. If the sensors later return values outside of the normal range, it may indicate that a fault is imminent or has occurred. Thus, in addition to detecting that faults have occurred and repair is needed, the sensors can allow for "predictive maintenance" to be performed before a fault actually occurs based on changing sensors values. For example, if a machine has an associated vibration sensor, then the system may record what vibrational modes are present and their intensity under normal operating conditions. If new vibrational modes are subsequently detected, this may indicate that a bearing is worn and should be replaced before it fails completely and causes additional damage to the machine.

Accordingly, technician 202 may be equipped with a head-mounted display (HMD) 220. In some embodiments, head-mounted display may be an optical HMD (also known as an optical see-through HMD) which overlays projected imagery on a partially transparent lens. In other embodiments, HMD 220 may be a digital HMD (also known as a video see-through HMD) which captures digital imagery using one or more cameras, overlays the projected imagery on the captured imagery, and displays the combined images on one or more displays (such as LCD or OLED displays) positioned in front of the eyes of the wearer. Because the wearer sees both their actual surroundings and the overlain information, this is also known as "augmented reality." Broadly, HMD 220 can be any display allowing technician 202 to see a view of the real world surroundings (whether directly or via a video camera/video display system) in combination with overlain information, in proximity to the real-world surroundings being displayed. For example, HMD 220 could be a smartphone configured to capture imagery from a camera on one side and display augmented imagery on the display on the opposite side.

In some embodiments, HMD 220 includes a camera (or cameras) to capture infrared imagery. This can be used to collect temperature information for the machinery, to recognize information displayed in the infrared spectrum (as discussed below), or for any other purpose. Thus, for example, HMD 220 could include two visible-light cameras and one infrared camera, two cameras sensitive in both the visible and infrared spectra, or a single infrared camera in conjunction with a see-through HMD.

In order to correctly position the overlain information, machines 204, 206, and 208 may also include machine-readable indicia 224, 226, and 228. Broadly, machine-readable indicia include any marker encoding information that can be recognized by a computer-vision system. For example, the machines may be labeled with bar codes, quick-recognition (QR) codes, or augmented reality tags. These machine-readable indicia encode information usable by the system to aid technician 202 in servicing the associated machine.

For example, a bar code may encode only an 11-digit number, which can encode a serial number or other unique identifier for the machine, but not encode detailed diagnostic information. An augmented reality tag allows for more robust recognition, but can typically encode fewer symbols. A QR code, by contrast, can encode more data (for example, specific values received from one or more associated sensors), but requires higher-resolution imagery to successfully decode. One of skill in the art will appreciate that any of these, alone or in combination, can be employed to provide the system with information about the various machines. Broadly speaking, any type of visual machine-readable indicia (now known or later developed) is contemplated as being with the scope of the invention. In some embodiments, multiple machine-readable indicia are positioned on various surfaces of the associated machine so that at least one indicium is visible regardless of the angle from which technician 202 is viewing the machine.

Machine-readable indicia 224, 226, and 228 may further be active or passive. As used in this specification, a passive machine-readable indicium is one that permanently displays a single encoded value. For example, a printed bar codes or augmented reality tags are examples of passive machine-readable indicia. By contrast, an active machine-readable indicium can display a plurality of encoded values. For example, an electrophoretic (such as e-ink) can be used to display an arbitrary image such as a machine-readable indicium. Alternatively, a static printed image can be used in combination with a backlight to display the machine-readable indicium only when the backlight is lit. Other types of display (such as a liquid-crystal display or light-emitting diode display) can also be used to display a machine-readable indicium. Either active or passive machine-readable indicia can be displayed in the visible or infrared spectrum. For example, passive machine-readable indicia can use inks that contrast when illuminated in the selected spectrum. Similarly, active machine-readable indicia can use light-emitting diodes that radiate light in the selected spectrum.

As disclosed above, active machine-readable indicia can encode a plurality of machine-readable values. In particular, this can be useful when a sensor for the associated machine detects a fault. In such a circumstance, the machine-readable indicia can activate (from displaying nothing to displaying a value) or change from displaying an "operating correctly" value to displaying a "fault condition" value. Alternatively (or in addition), active machine-readable indicia can continuously update to display data received from one or more sensors for the associated machine.

In some embodiments, active machine-readable indicia communicate directly with one or more associated sensors. Communication may be via a wireless protocol such as Bluetooth®, Zigbee (i.e., the IEEE 802.15.4 family of protocols), or WiFi. Alternatively, the machine-readable indicia may communicate with central controller 210, head-mounted display 220, other machine-readable indicia, and/or any other components of the system. For example, the machine-readable indicia may form a mesh network (alone or in combination with other system components) to communicate with head-mounted display 220. In some embodiments, machine-readable indicia such as machine-readable indicium 216 may be integrated into sensors such as sensor 226, allowing the sensor to display the encoded information directly on an exterior housing of the sensor. In other embodiments, both sensors and machine-readable indicia may be integrated into a machine and communicate via a wired control bus with a controller for the machine.

Figure 3:
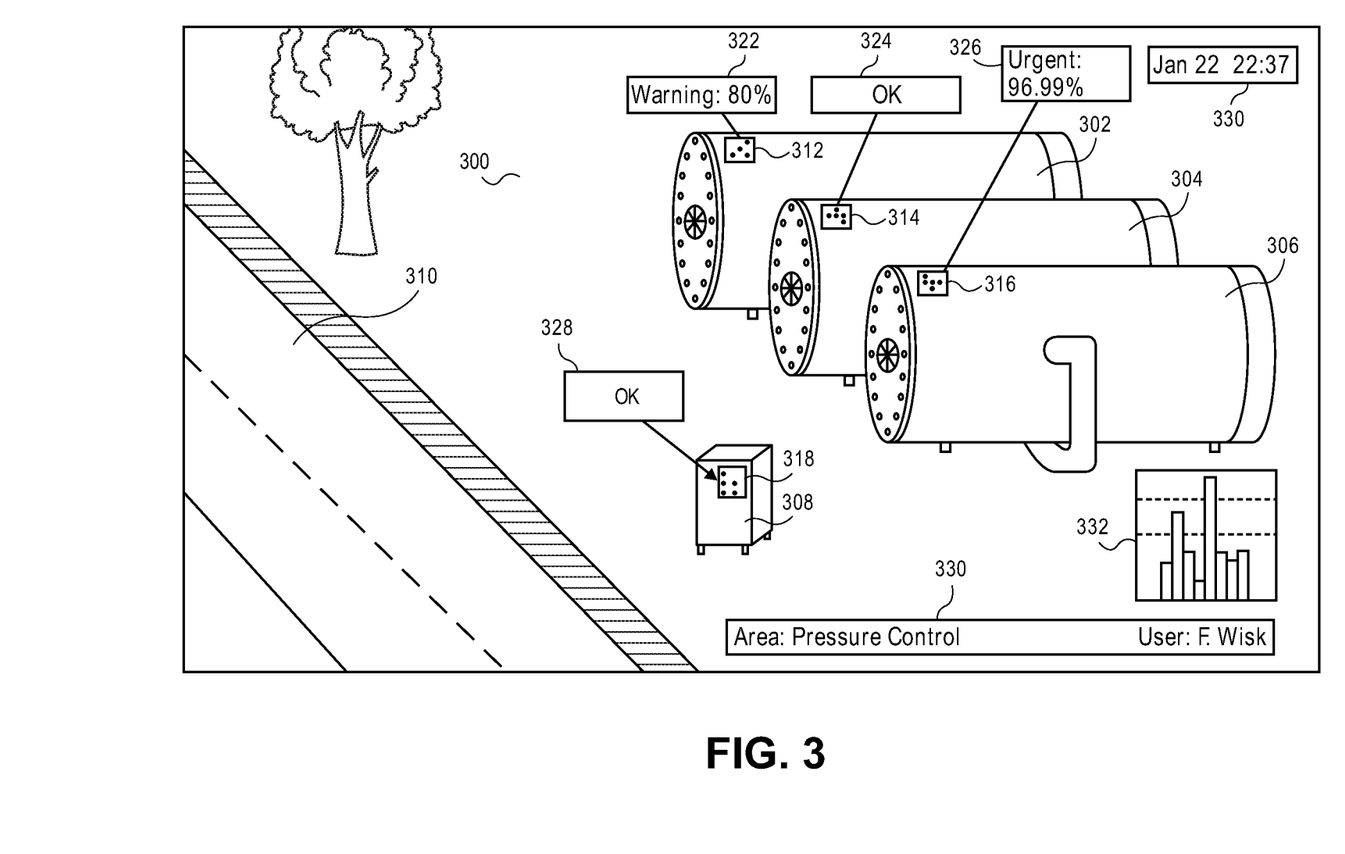
FIG. 3 depicts an exemplary scene the might be displayed in accordance with embodiments of the invention.

Turning now to FIG. 3, an exemplary scene the might be displayed on HMD 220 is depicted and referred to generally by reference numeral 300. As depicted, a user such as technician 202 is viewing an area with four machines: pressure vessel 302, pressure vessel 304, pressure vessel 306, and pump 308. As discussed above with respect to FIG. 2, pressure vessel 302 has associated machine-readable indicia 312, pressure vessel 304 has associated machine-readable indicia 314, pressure vessel 306 has associated machine-readable indicia 316, and pump 308 has associated machine-readable indicia 318. Note that the base image includes both the components that are part of the production system (such as the pressure vessels) as well as things that are not part of the production system (such as road 310 and the tree).

In addition to the real-world scene that would be visible to the unaided vision of a user such as technician 202, scene 300 includes a number of overlays providing the user with information regarding the status and operation of the system as a whole as well as the individual machines making it up. In some embodiments, the status displays for a particular machine are displayed in proximity to that machine. Status displays such as status 322 may have a visual tether or tail tied to the associated machine-readable indicia to allow technician 202 to more easily locate the associated machine. For example, the status 322 for machine 302 shows that machine 302 is operating at 80% of capacity, and may need to be serviced soon. Status 322 is associated with machine-readable indicium 312 so that, as technician 202 proceeds along road 310, status 322 remains unobstructed and oriented so as to face technician 202. Similarly, status 324, associated with machine 304, shows that machine 304 is operating within all design parameters. In some embodiments, machines with no warnings or fault conditions do not have associated status displays so as to avoid cluttering display 300 with unneeded information.

Similarly to machine 304, machine 308 has status display 328 indicating that it is functioning within normal parameters. In some embodiments, displays may be standardized across all machine types. In other embodiments, each type of machine has its own status display to provide information particular to that machine. In still other embodiments, each type of machine has its own type of display, but displays are color-coded to indicate an alarm level. For example, displays 324 and 328 may be colored green to indicate that there is no need for concern, while display 322 may be colored yellow to indicate a warning and display 326 may be colored red to indicate an urgent alarm. As depicted for status 322 and status 326, supplementary information for the warning or alarm may also be depicted.

Global information unrelated to a particular machine (or combining information for multiple machines) may also be included in display 300. For example, non-contextual displays 330 provide an overlay giving technician 202 access to the current date and time as well as area and log-on information. In some embodiments, these non-contextual displays 330 are positioned at fixed positions at the perimeter of display 300, so as to avoid obstructing vision. In some embodiments, supplementary displays 332 may also be included in display 300. For example, as depicted, supplementary display 332 shows operating capacity for all pressure vessels together with thresholds for warning and urgent alarm statuses. In some such embodiments, the user can configure the supplementary displays to show the relevant information for the current area or task.

Figure 4:
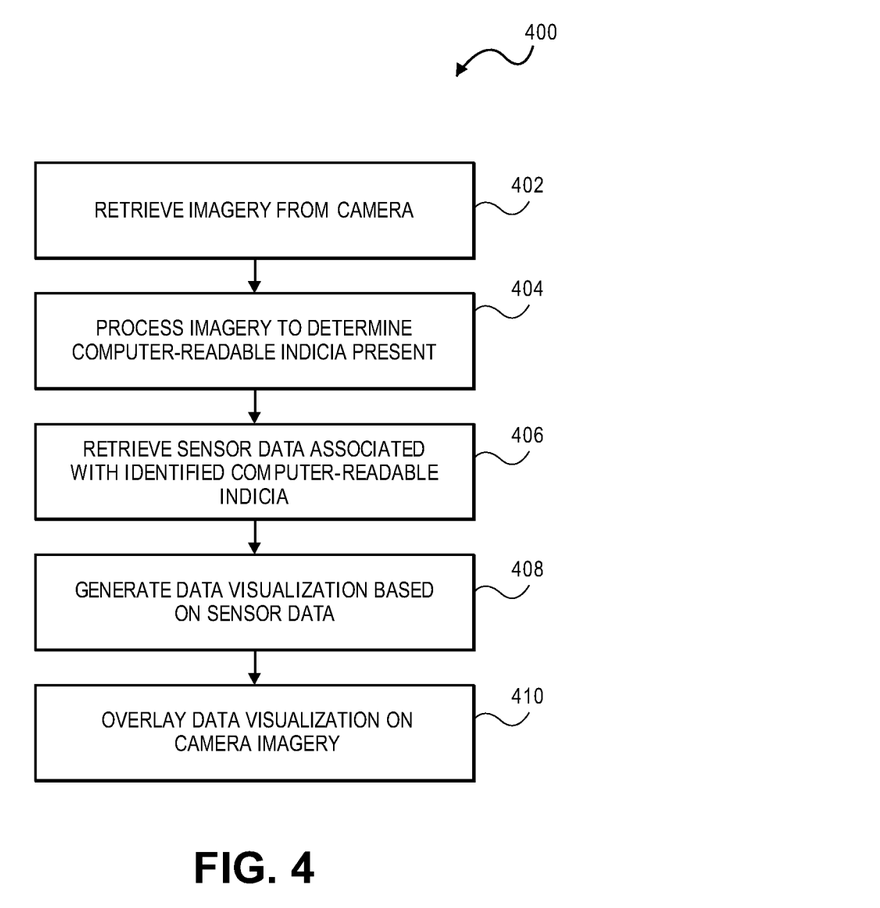
FIG. 4 depicts a flowchart illustrating the operation of a method in accordance with embodiments of the invention.

Turning now to FIG. 4, a flowchart illustrating the operation of a method in accordance with embodiments of the invention is depicted and referred to generally by reference numeral 400. The method begins at a step 402 where raw imagery from one or more cameras on HMD 220 for technician 202 is retrieved for processing. In some embodiments where multiple cameras are present, imagery from only a single camera is retrieved for processing. In some embodiments, camera imagery is processed on a processor of HMD 220. In other embodiments, HMD 220 transmits the imagery from the camera(s) to another computer (such as, for example, central controller 210) for processing.

Next, at a step 404, the imagery is retrieved to identify the machine-readable indicia present in the image. Broadly speaking, the precise techniques used to identify a machine-readable indicium will depend on the type of indicium used. For example, techniques for recognizing bar codes will differ from techniques for recognizing QR codes, which will in turn differ from techniques for recognizing augmented reality tags. One of skill in the art will appreciate that each type of machine-readable indicia has an associated recognition algorithm. The steps described below are representative and should not be considered limiting.

Broadly speaking, a recognition algorithm will start by converting the imagery received from the camera(s) to a single channel representing intensity (e.g., a grayscale image). In some embodiments, such as those utilizing infrared cameras to recognize machine-readable indicia, the imagery may include only a single channel that can be interpreted as the needed intensity channel. Alternatively, a color image can be converted if necessary to a desired representation (for example, to a hue/saturation/intensity representation) and the relevant channel (here, the intensity channel) extracted.

Once the relevant channel has been extracted, thresholding can be used to determine connected components of the image with a gray level less than the threshold. In this way, the light-colored regions delimiting the machine-readable indicia can be identified. In other embodiments, the connected components of the image with a gray level above the threshold are instead determined to identify dark regions. In still other embodiments, both light-colored and dark-colored regions are identified with different thresholds. Because machine-readable indicia are typically constructed using high-contrast colors, using dual thresholding may more accurately identify regions of the indicia.

Next, once the thresholded regions are identified, the external border contours are extracted from the identified regions. This allows the high-contrast shapes in the image to be identified. At this stage, the identified shapes include any machine-readable indicia, but also any other shapes with high-contrast edges present in the image. For example, letterforms, signs and windows present in the image may also be identified as high-contrast shapes.

Once the high-contrast shapes have been identified, they are filtered to eliminate non-quadrilateral shapes. For example, the high-contrast letterforms mentioned above are eliminated from the recognized shapes because they are not quadrilaterals. In order to recognize quadrilaterals, the boundary of each shape can first be linearized (points lying in a narrow rectangular region are converted to a line). Shapes comprising up more than four such linear regions, or whose linear regions have endpoints that do not meet the endpoints of another linear region, are non-quadrilaterals and can be eliminated.

For the remaining quadrilaterals, the points of intersection for the four segments (i.e., the vertices of the quadrilateral) are extracted. The vertices of each extracted quadrilateral can then be used to determine the unique projective (collinear) transformation for that quadrilateral that will map it to the unit square. Applying this transformation to the image allows the identified quadrilateral to be compared (in standardized form) to the reference form of the particular machine-readable indicia being used. Then, a most likely encoded value for the particular machine-readable indicium and a confidence value that the identified region actually corresponds to the identified encoded value can be determined. If the confidence value is above a predetermined threshold, then the identified marker is associated with the corresponding region in the original image. Where multiple images are to be processed (e.g., one image for each camera), the images may be processed separately and the confidence values for the corresponding regions of each image aggregated to determine whether a machine-readable indicium is present in that spatial region.

Once the set of machine-readable indicia present in the scene has been identified, processing can proceed to step 406, where data from the sensors associated with each identified machine-readable indicium is retrieved and processed. In some embodiments, the data is retrieved by querying the sensors directly. In other embodiments, all sensors communicate their data to a central controller and the data from the relevant sensors is retrieved from the central controller. In still other embodiments, the sensor data is retrieved from the machine associated with the sensor.

In some embodiments, the raw data from the sensor is presented to the user. For example, if a sensor detects temperature, then the sensor may report the temperature to the central controller, where it is forwarded to the HMD and presented directly to the user. In other embodiments, or for other sensors, the data is processed before being presented to the user. For example, if the sensor is a vibration sensor, the raw vibration waveform may not be informative. Instead, the sensor regularly forwards the raw data to the server, which accumulates it and processes it using a Fast Fourier Transform to identify the vibrational modes. When the data for that sensor is requested by the HMD, the transformed data is forwarded for presentation to the user, allowing the user to immediately see any potentially problematic vibrational modes.

Once the data has been retrieved and processed, a display for that sensor can be generated at step 408. Broadly speaking, any type of data visualization can be employed to convey the relevant information to the user. For example, time-series graphs of data may be presented for one type of sensor, spectral data may be presented for a second type of sensor, and a single instantaneous value can be presented for a third type of sensor. As described above, data displays may be color coded (for example, by coloring their background) to represent a determined status for the sensor or for the associated machine. In some embodiments, users may be able to cycle between different representations of the data.

Processing then proceeds to step 410 where the generated display for each recognized machine-readable indicium is overlain on the display in proximity to the associated indicium or sensor. In some embodiments, as described above, generated displays are connected to the image of the associated machine-readable indicium via a marker. In other embodiments, the generated display is overlain directly on the associated machine-readable indicium. As discussed above, generated displays for sensors reporting no fault may be suppressed or suppressed only when one or more other sensors indicate an aberrant condition. Where the system includes a display for each eye, the generated displays may be overlain on a single eye to allow transparency or on both eyes to provide a three-dimensional effect.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for providing an augmented reality interface for sensor applications, comprising:
   a plurality of sensors, wherein each sensor:
      comprises a transducer and a communication interface;
      is configured to gather raw sensor data for a machine, wherein the raw sensor data is not suitable for visualization; and
      has an associated machine-readable indicium;

a camera, configured to capture imagery of a scene including a machine-readable indicium associated with a sensor of the plurality of sensors;

an infrared camera generating infrared imagery of the machine;

a central controller programmed to:
receive the raw sensor data from the plurality of sensors, and process the raw sensor data into sensor data suitable for visualization, a processor, programmed to:
receive the camera imagery and recognize the machine-readable indicium,
determine the sensor of the plurality of sensors associated with the machine-readable indicium;
upon determination of the sensor, request, by a head-mounted display, the sensor data suitable for visualization;

receive the sensor data suitable for visualization from the central controller;
process the sensor data suitable for visualization to generate a data visualization associated with the sensor of the plurality of sensors;
determine an operating capacity of the machine associated with the sensor based on the raw sensor data;
determine the temperature of the machine based at least in part on the infrared imagery;
generate an augmented display including the scene, the data visualization associated with the sensor of the plurality of sensors, and the temperature of the machine determined from the infrared imagery;
present the data visualization on a data visualization display,
wherein a type of the data visualization display is indicative of a type of machine associated with the sensor,
wherein the data visualization display presents an option for the user to cycle through various types of data representations,
wherein the data visualization includes the operating capacity relative to operational thresholds for alarm statuses of the machine and the temperature of the machine determined from the infrared reading; and
suppress the data visualization associated with the sensor of the plurality of sensors only when one or more other sensors of the plurality of sensors indicate an aberrant condition; and
a portable display, configured to display the augmented scene in proximity to the scene,
wherein a non-contextual display presents non-contextual information, and is configured to be fixed, by a user, at a location on the augmented display to avoid obstructing the augmented scene.

2. The system of claim 1, wherein the camera, the display, and the processor are integrated into a single unit.

3. The system of claim 2, wherein the single unit is the head-mounted display.

4. The system of claim 1,
wherein the camera and the display are integrated into the head-mounted display, and
wherein the machine-readable indicium is displayed by electrophoresis.

5. The system of claim 1, wherein the machine-readable indicium is an artificial reality tag.

6. The system of claim 1, wherein the data visualization is color-coded to indicate a status of the machine.

7. The system of claim 1, wherein the machine-readable indicium includes a plurality of infrared light-emitting diodes.

8. A method for generating an augmented reality display of a scene, comprising the steps of:
receiving, from a camera, imagery of a scene;
receiving, from an infrared camera, infrared imagery of the scene,
wherein the imagery of the scene includes a machine with at least one machine-readable indicium associated with a sensor;
processing the imagery of the scene to identify the machine-readable indicium;
processing the infrared imagery of the scene to determine a temperature;
determining the sensor associated with the machine-readable indicium;
upon determination of the sensor, request, by a head-mounted display, raw sensor data for the machine associated with the machine-readable indicium;
retrieving, by a central controller, raw sensor data from the sensor,
wherein the raw sensor data is not suitable to visualization;
processing, by the central controller, the raw sensor data into the sensor data suitable for visualization;
retrieving, from the central controller, the raw sensor data for the machine;
determining an operating capacity of the machine based on the raw sensor data;
generating a data visualization based on the sensor data suitable for visualization for the machine,
presenting the data visualization on a data visualization display,
wherein a type of the data visualization display is indicative of a machine type of the machine associated with the sensor,
wherein the data visualization display presents an option for the user to cycle through various types of data representations,
wherein the data visualization includes the operating capacity relative to operational thresholds for alarm statuses of the machine and the temperature determined from the infrared imagery;
overlaying the data visualization on the imagery of the scene in proximity to the machine-readable indicium to form an augmented scene when the raw sensor data is indicative of an aberrant condition;
suppressing data visualization associated with at least one other sensor on the augmented screen;
displaying the augmented scene on a display in proximity to the scene;
displaying at least one supplemental display on the display including non-contextual information,
wherein the supplemental display is configurable by the user, and
wherein the supplemental display is fixed at a location by the user to avoid obstructing the augmented scene.

9. The method of claim 8, wherein the camera and the display are integrated into the head-mounted display.

10. The method of claim 8, wherein the machine-readable indicium is a bar code.

11. The method of claim 8, wherein the data visualization is color coded to indicate a status of the machine.

12. The method of claim 8, wherein the data visualization is suppressed from the augmented scene if the raw sensor data for the machine indicates that the machine is operating normally.

13. The method of claim 8, wherein data from a plurality of sensors for the machine is combined to generate the data visualization.

14. One or more non-transitory computer-storage media storing computer executable instructions that, when executed by a processor, perform a method of generating an augmented reality display of a scene, the method comprising the steps of:

receiving data from a plurality of sensors associated with a respective plurality of machines, wherein each sensor of the plurality of sensors is further associated with a respective machine-readable indicium;

receiving imagery of a scene;

receiving infrared imagery of the scene, wherein the imagery includes at least one visible machine-readable indicium;

determining, based on the visible machine-readable indicium, a sensor of the plurality of sensors;

upon determination of the sensor, request, by a head-mounted display, raw sensor data for the machine associated with the machine-readable indicium;

receiving, by a central controller, raw sensor data from the sensor, wherein the raw sensor data is not suitable for visualization;

processing the raw sensor data into the sensor data suitable for visualization;

determining an operating capacity of the respective machine based on the raw sensor data received from the sensor;

determining a temperature of the respective machine based at least on part on the infrared imagery;

generating a data visualization from the sensor data suitable for visualization received from the determined sensor by the central controller, present the data visualization on a data visualization display, wherein a type of the data visualization display is indicative of a type of machine associated with the determined sensor, wherein the data visualization display presents an option for the user to cycle through various types of data representations, wherein the data visualization includes the operating capacity relative to operational thresholds for alarm statuses of the machine and the temperature determined from the infrared imagery;

displaying the data visualization on a portion of a display separate from the imagery of the scene to form an augmented scene;

suppressing the data visualization when one or more other sensors indicate an aberrant condition, displaying data visualization associated with the one or more other sensors indicative of the aberrant condition;

displaying the augmented scene on the display to the user;

displaying non-contextual information by a non-contextual display wherein the non-contextual display is configurable by the user, and wherein a fixed location of the non-contextual display is configurable by the user to avoid obstructing the augmented scene.

15. The media of claim 14, wherein the display and the camera are integrated into the head-mounted display.

16. The media of claim 14, wherein the display and the camera are integrated into a smartphone.

17. The media of claim 14, wherein the scene includes a plurality of machine-readable indicia other than the visible machine-readable indicia, and wherein data visualizations for each of the associated plurality of sensors are overlain on the scene in the augmented scene.

18. The media of claim 14, wherein the data visualization is color coded to indicate a status of the machine, and wherein the data visualization is displayed over only one eye of the user.

19. The media of claim 14, wherein the data visualization is suppressed from the augmented scene if the data received from the determined sensor indicates that the machine is operating normally.

20. The media of claim 14, wherein the machine-readable indicium is a quick-response code.

* * * * *